H. A. WEBER, OF COLUMBUS, OHIO.

*Letters Patent No. 89,527, dated April 27, 1869.*

COMPOSITION FOR ROOFING, PAVEMENTS, FLOORS, &c.

The Schedule referred to in these Letters Patent and making part of the same.

*To all whom it may concern:*

Be it known that I, H. A. WEBER, of Columbus, in the county of Franklin, and State of Ohio, have invented certain new and useful Improvements in Composition of Matter; and I do hereby declare that the following is a full, clear, and exact description thereof.

To enable others skilled in the art to construct and use my invention, I will proceed to describe it.

My invention relates to composition of matter, and consists in the production of a new and useful compound, by mixing, in novel proportions, several well-known ingredients.

My compound, thus produced, is useful in forming a new chemical cement, which I have found valuable for many purposes in the arts.

To produce my cement, I take, of quartz sand, one hundred and twenty pounds; pulverized limestone, thirty pounds; litharge, nine pounds; red lead, one-quarter of a pound; rosin, four pounds; and beeswax, one-quarter of a pound, and mix them as follows:

I first take the beeswax and rosin, and melt them together. As soon as the mass has cooled, I thoroughly pulverize it, and then mix it, in any convenient manner, with the other named ingredients, having finely pulverized and well dried them by artificial heat, if necessary for that purpose.

The composition thus made forms a greyish powder, which can be kept in kegs, sacks, or other suitable receptacles, for any length of time desired. In this form it may be conveniently stored, or transported any distance.

When desired for use, I take a hundred weight of this composition, and mix it thoroughly with one (1) gallon of linseed-oil, and two (2) pints of japan or other drying-oil.

A greater or less quantity may be made, by adapting the proportions of the ingredients to suit the production of the quantity desired.

When thus mixed, at first the mixture will be found to have the consistency of wet sand, but becomes more plastic in the course of an hour or so, when it can be easily spread with an ordinary trowel.

After application, and in about twenty-four (24) or thirty-six (36) hours, it assumes a very tenacious and solid character, and, in the course of a few weeks, becomes equal to stone in hardness, and will neither crack, crumble, or wear away, perceptibly for a long time.

It adheres with equal tenacity to wood, stone, glass, metal, and all similar substances, and resists equally well the action of the weather and of water, so that it can be applied with like advantages to surfaces exposed to the open air, as well as to those under water.

The objects to which it is applied, should be perfectly dry, and slightly coated with linseed-oil.

I have found it very useful for many purposes in building, as it serves to unite building-materials in a strong and admirable manner, and where desired, forms a water-proof and air-tight covering.

It is especially adapted for roofing, pavements, cellar-floors, and like purposes, as well as for coating cisterns, reservoirs, water-basins, and other objects required to be perfectly water-tight.

It may also be used advantageously for coating, or stuccoing wooden, stone, or brick buildings, as well as the bottoms of vessels exposed to the action of the water and marine insects. As a protection for sills, railroad-ties, fence-posts, and all similar articles, it is very useful.

When used for any of these purposes, it should be applied in sufficient quantities to simply answer the end designed. For instance, in using it for roofing, a layer of one-fourth ($\frac{1}{4}$) of an inch in thickness of the cement will answer the purpose; and when used for any of the purposes mentioned, the operator will be guided by his judgment as to the quantity required.

Having thus described my invention,

What I claim, is—

The composition, or chemical cement, composed of the ingredients herein mentioned, in the proportions and manner substantially as herein described, and for the purposes set forth.

H. A. WEBER.

Witnesses:
   J. E. FUCHS, M. D.,
   LEOPOLD SCHAUB.